US010367918B2

(12) United States Patent
Juan et al.

(10) Patent No.: US 10,367,918 B2
(45) Date of Patent: *Jul. 30, 2019

(54) SYSTEM TO DYNAMICALLY ADJUST REQUEST VALUES AT A BACK-END APPLICATION SERVER

(71) Applicant: Hartford Fire Insurance Company, Hartford, CT (US)

(72) Inventors: Stephen Juan, Livermore, CA (US); Cynthia D. Finley, Lyme, CT (US); Linda L. Ternullo, Tolland, CT (US); Jeffrey C. Thompson, Meridian, ID (US); Brian Foti, Tampa, FL (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/039,612

(22) Filed: Jul. 19, 2018

(65) Prior Publication Data

US 2018/0332091 A1 Nov. 15, 2018

Related U.S. Application Data

(63) Continuation of application No. 14/874,087, filed on Oct. 2, 2015, now Pat. No. 10,057,313.

(51) Int. Cl.
*H04L 29/06* (2006.01)
*H04L 29/08* (2006.01)

(52) U.S. Cl.
CPC ............ *H04L 67/36* (2013.01); *H04L 67/025* (2013.01); *H04L 67/10* (2013.01); *H04L 67/20* (2013.01)

(58) Field of Classification Search
USPC .................. 705/35, 37, 38, 39, 40, 41, 4, 5; 707/915; 717/122, 170, 105
See application file for complete search history.

(56) References Cited

U.S. PATENT DOCUMENTS 6,023,578 A * 2/2000 Birsan ....................... G06F 8/10
717/105
7,003,482 B1 * 2/2006 Margoscin ............. G06Q 10/10
705/35

(Continued)

*Primary Examiner* — Tien C Nguyen
(74) *Attorney, Agent, or Firm* — Buckley, Maschoff & Talwalkar LLC

(57) ABSTRACT

According to some embodiments, systems, methods, apparatus, computer program code and means may receive data streams from remote third-party administrator computer servers. A back-end application computer server may receive a set of requests from a first third-party administrator computer server, each request being associated with a request value. The back-end application server may retrieve a first set of pre-determined rules and automatically apply them to the set of requests, resulting in an adjusted request value and an overall value. The back-end computer server may then automatically transmit a settlement instruction, including the overall value, to an electronic transaction system, and render a transaction activity report display via a remote computer device, associated with the first third-party administrator computer server, including information about the set of requests, the adjusted request value along with an indication of a reason for the adjustment, and the overall value.

20 Claims, 12 Drawing Sheets

(56) References Cited

U.S. PATENT DOCUMENTS

| | | | | |
|---|---|---|---|---|
| 7,856,617 B2* | 12/2010 | Szlam | ................... | G06F 19/328 |
| | | | | 705/4 |
| 8,065,168 B2* | 11/2011 | Szlam | ................... | G06Q 10/06 |
| | | | | 705/4 |
| 8,453,138 B2* | 5/2013 | Meller | ................... | G06F 8/654 |
| | | | | 717/170 |
| 8,478,769 B2* | 7/2013 | Goldfarb | ................ | G06Q 10/10 |
| | | | | 705/4 |
| 8,904,349 B2* | 12/2014 | Hudson, Jr. | ............... | G06F 8/36 |
| | | | | 707/955 |
| 2003/0158760 A1* | 8/2003 | Kannenberg | .............. | G06F 8/70 |
| | | | | 705/4 |
| 2004/0103124 A1* | 5/2004 | Kupkova | ................ | G06F 16/93 |
| 2008/0235064 A1* | 9/2008 | Gulko | .................. | G06Q 10/087 |
| | | | | 705/4 |
| 2011/0072416 A1* | 3/2011 | Hudson, Jr. | ............... | G06F 8/36 |
| | | | | 717/122 |

* cited by examiner

BACK-END APPLICATION SERVER – THIRD PARTY ADMINISTRATOR PAYMENTS

PORTAL – TRANSACTION ACTIVITY REPORT

| IDENTIFIER (SUB-IDENTIFIER) | REQUEST IDENTIFIER | REQUEST DATE (TIME) | REQUEST VALUE | ADJUSTED VALUE | ACCUMULATED VALUE | ADJUSTMENT REASON |
|---|---|---|---|---|---|---|
| 101 (1) | R_101 | 8/20/2018 (10:30) | 500 | 0 | 500 | UNDER 1,000 |
| 101 (1) | R_102 | 8/20/2018 (9:23) | 500 | 0 | 1,000 | UNDER 1,000 |
| 101 (1) | R_103 | 8/21/2018 (14:55) | 500 | 500 | 1,500 | N/A |
| 101 (1) | R_104 | 8/22/2018 (11:41) | 5,000 | 5,000 | 5,500 | N/A |
| 101 (1) | R_105 | 8/24/2018 (13:33) | 500 | 500 | 6,000 | N/A |
| 101 (1) | R_106 | 8/25/2018 (7:14) | 1,000 | 1,000 | 7,000 | N/A |
| 101 (1) | R_107 | 8/25/2018 (13:58) | 5,000 | 3,000 | 12,000 | PARTLY OVER 10,000 |
| 101 (1) | R_108 | 8/25/2018 (9:21) | 1,000 | 0 | 13,000 | OVER 10,000 |

FIG. 6

BACK-END APPLICATION SERVER – THIRD PARTY ADMINISTRATOR PAYMENTS

PORTAL – TRANSACTION ACTIVITY REPORT (2/1/2015 TO 2/28/2015)

| Transactions Total Amount | Cumulative Total Paid | TPA Claim # | Date of Loss | Crrnt Month Payable | Transaction Amount | Payment Description | Product Name | Policy Number | Deductible | TPA ID |
|---|---|---|---|---|---|---|---|---|---|---|
| 402101.03 | 1025647.5 | 1234567 | 1/12/2009 | 292.44 | 292.44 | MEDICAL | WORKERS' COMP | P1234 | 500000 | 101 |
| | | 1234567 | 1/12/2009 | 400000 | 400000 | MINOR PERM. PARTIAL DISABILITY | WORKERS' COMP | P1234 | 500000 | 101 |
| | | 1234567 | 1/12/2009 | 457.56 | 457.56 | MEDICAL | WORKERS' COMP | P1234 | 500000 | 101 |
| | | 1234567 | 1/12/2009 | 29.61 | 29.61 | MEDICAL | WORKERS' COMP | P1234 | 500000 | 101 |
| | | 1234567 | 1/12/2009 | 319.57 | 319.57 | MEDICAL | WORKERS' COMP | P1234 | 500000 | 101 |
| | | 1234567 | 1/12/2009 | 414.84 | 414.84 | MEDICAL | WORKERS' COMP | P1234 | 500000 | 101 |
| | | 1234567 | 1/12/2009 | 12.84 | 12.84 | VENDED UTILIZATION REVIEWS | WORKERS' COMP | P1234 | 500000 | 101 |
| | | 1234567 | 1/12/2009 | 256.67 | 256.67 | MEDICAL | WORKERS' COMP | P1234 | 500000 | 101 |
| | | 1234567 | 1/12/2009 | 151.48 | 151.48 | MEDICAL | WORKERS' COMP | P1234 | 500000 | 101 |
| | | 1234567 | 1/12/2009 | 123.3 | 123.3 | DOCTOR | WORKERS' COMP | P1234 | 500000 | 101 |
| | | 1234567 | 1/12/2009 | 42.72 | 42.72 | MEDICAL | WORKERS' COMP | P1234 | 500000 | 101 |

FIG. 9

BACK-END APPLICATION SERVER – THIRD PARTY ADMINISTRATOR PAYMENTS

PORTAL – EXCESS CALCULATION REPORT

| TPA ID | Policy Number | Limit | Policy Eff | Policy Exp | Prior IND Paid | Product | Pricing Plan | Retention Limits | Step Limits-Definition | Step Claim | Step Amount | Exception Definition | Exception (Type) | Exception | Limit Amount |
|---|---|---|---|---|---|---|---|---|---|---|---|---|---|---|---|
| 101 | P1234 | | 6/1/2008 | 6/1/2009 | | WC | DEDUCTIBLE | 500000 | | | | E | State | AZ | 0 |
| 101 | P1234 | | 6/1/2008 | 6/1/2009 | | WC | DEDUCTIBLE | 500000 | | | | E | State | AZ | 0 |
| 101 | P1234 | | 6/1/2008 | 6/1/2009 | | WC | DEDUCTIBLE | 500000 | | | | IM | State | AZ | 500000 |
| 101 | P1234 | | 6/1/2008 | 6/1/2009 | | WC | DEDUCTIBLE | 500000 | | | | IM | State | AZ | 500000 |
| 101 | P1234 | | 6/1/2008 | 6/1/2009 | | WC | DEDUCTIBLE | 500000 | IME | C111 | 1000000 | | | | |
| 101 | P1234 | | 6/1/2008 | 6/1/2009 | | WC | DEDUCTIBLE | 500000 | IME | C111 | 1000000 | | | | |
| 101 | P1234 | 1000000 | 6/1/2008 | 6/1/2009 | | WC | DEDUCTIBLE | 500000 | IME | | 1000000 | | | | |
| 101 | P1234 | 1000000 | 6/1/2008 | 6/1/2009 | | WC | DEDUCTIBLE | 500000 | IME | | 1000000 | | | | |

| State | Claim # | Limit | Prior IND Paid | Prior MED Paid | Prior EXP Paid | Total Prior | Current IND Paid | Current MED paid | Current EXP Paid | Total Current | Claim Level Payable |
|---|---|---|---|---|---|---|---|---|---|---|---|
| MO | C111 | 1000000 | 607114.6 | 358912.3 | 69884.27 | 1035911.2 | 607114.6 | 507035.8 | 69896.41 | 1184046.8 | 148135.6 |
| MO | C111 | 1000000 | 607114.6 | 358912.3 | 69884.27 | 1035911.2 | 607114.6 | 507035.8 | 69896.41 | 1184046.8 | 148135.6 |

*FIG. 10*

SYSTEM TO DYNAMICALLY ADJUST REQUEST VALUES AT A BACK-END APPLICATION SERVER

CROSS-REFERENCE TO RELATED APPLICATION

The present application is a continuation of U.S. patent application Ser. No. 14/874,087 entitled "SYSTEM TO DYNAMICALLY ADJUST REQUEST VALUES AT A BACK-END APPLICATION SERVER" and filed on Oct. 2, 2015. The entire content of that application is incorporated herein by reference.

FIELD

The present invention relates to computer system servers and more particularly to computer systems that facilitate a dynamic, accurate, and transparent adjustment of request values at a back-end application server.

BACKGROUND

In some cases, a back-end application platform may receive a set of manually generated and/or paper (or pdf file) requests, each request including a request value. For example, the sets of requests may be received from different remote third-party administrator platforms throughout a month. Experts at the back-end application platform may review the requests to ensure that each request (and request value) conforms to one of a number of different rules. The experts may change the request values as appropriate in view of those rules and determine an overall amount associated with each third-party administrator platform. Reviewing the sets of requests, however, can be a time consuming and error prone process—especially when there are a substantial number of requests, a substantial number of third-party administrator platforms, and/or wide ranging differences between the rules that need to be used to review the requests. Note that some back-end application platforms might receive sets of requests from tens, or even hundreds, of different third-party administrator platforms (and each platform could be submitting tens of thousands of requests every month).

It would therefore be desirable to provide systems and methods to facilitate a dynamic, accurate, and transparent adjustment of request values for a back-end application.

SUMMARY

According to some embodiments, systems, methods, apparatus, computer program code and means may receive data streams from remote third-party administrator computer servers. A back-end application computer server may receive a set of requests from a first third-party administrator computer server, each request being associated with a request value. The back-end application server may retrieve a first set of pre-determined rules and automatically apply them to the set of requests, resulting in an adjusted request value and an overall value. The back-end computer server may then automatically transmit a settlement instruction, including the overall value, to an electronic transaction system, and render a transaction activity report display via a remote computer device, associated with the first third-party administrator computer server, including information about the set of requests, the adjusted request value along with an indication of a reason for the adjustment, and the overall value.

Some embodiments comprise: means for receiving at a communication port a plurality of data streams of electronic messages, each data stream being received from one of a plurality of remote third-party administrator computer servers via a distributed communication network; means for storing information received in the data streams of electronic messages into a data stream computer store; means for accessing a rules computer store storing different sets of pre-determined rules for different third-party administrator computer servers; means for receiving, by a back-end application computer server from the data stream computer store, information associated with a set of requests from a first third-party administrator computer server, each request being associated with a request value; means for retrieving, by the back-end application computer server from the rules computer store, a first set of pre-determined rules for the first third-party administrator computer server; means for automatically applying, by the back-end application computer server, the first set of pre-determined rules to the set of requests from the first third-party administrator computer server, said application resulting in at least one adjusted request value for the set of requests and an overall value based at least in part on the request values and the adjusted request value associated with the set of requests; means for automatically transmitting, by the back-end application computer server, a settlement instruction, including the overall value, to an electronic transaction system; and means for rendering, by the back-end application computer server, a transaction activity report display via a remote computer device, associated with the first third-party administrator computer server, including information about the set of requests, the at least one adjusted request value along with an indication of a reason for the adjustment, and the overall value.

A technical effect of some embodiments of the invention is an improved and computerized method to facilitate a dynamic, accurate, and transparent adjustment of request values at a back-end application server. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 6 is an example of a transaction activity report user interface associated with a first example in accordance with some embodiments.

FIG. 9 is an example of a transaction activity report user interface associated with insurance in accordance with some embodiments.

FIG. 10 is an example of an excess calculation report user interface associated with insurance in accordance with some embodiments.

DETAILED DESCRIPTION

The present invention provides significant technical improvements to facilitate dynamic data processing. The present invention is directed to more than merely a computer implementation of a routine or conventional activity previously known in the industry as it significantly advances the technical efficiency, access and/or accuracy of data created devices described in connection with some embodiments by implementing a specific new method and system as defined herein. The present invention is a specific advancement in the areas of back-end application computer servers by providing technical benefits in data accuracy, data availability, data transparency, and data integrity and such advances are not merely a longstanding commercial practice. The present invention provides improvement beyond a mere generic computer implementation as it involves the processing and conversion of significant amounts of data in a new beneficial manner as well as the interaction of a variety of specialized back-end, client, and/or third-party systems, networks, and subsystems. For example, in the present invention information may be transmitted from a remote third-party administrator server to a back-end application computer server and that information, including request values, may be adjusted as appropriate in an accurate and transparent manner.

Figure 1:
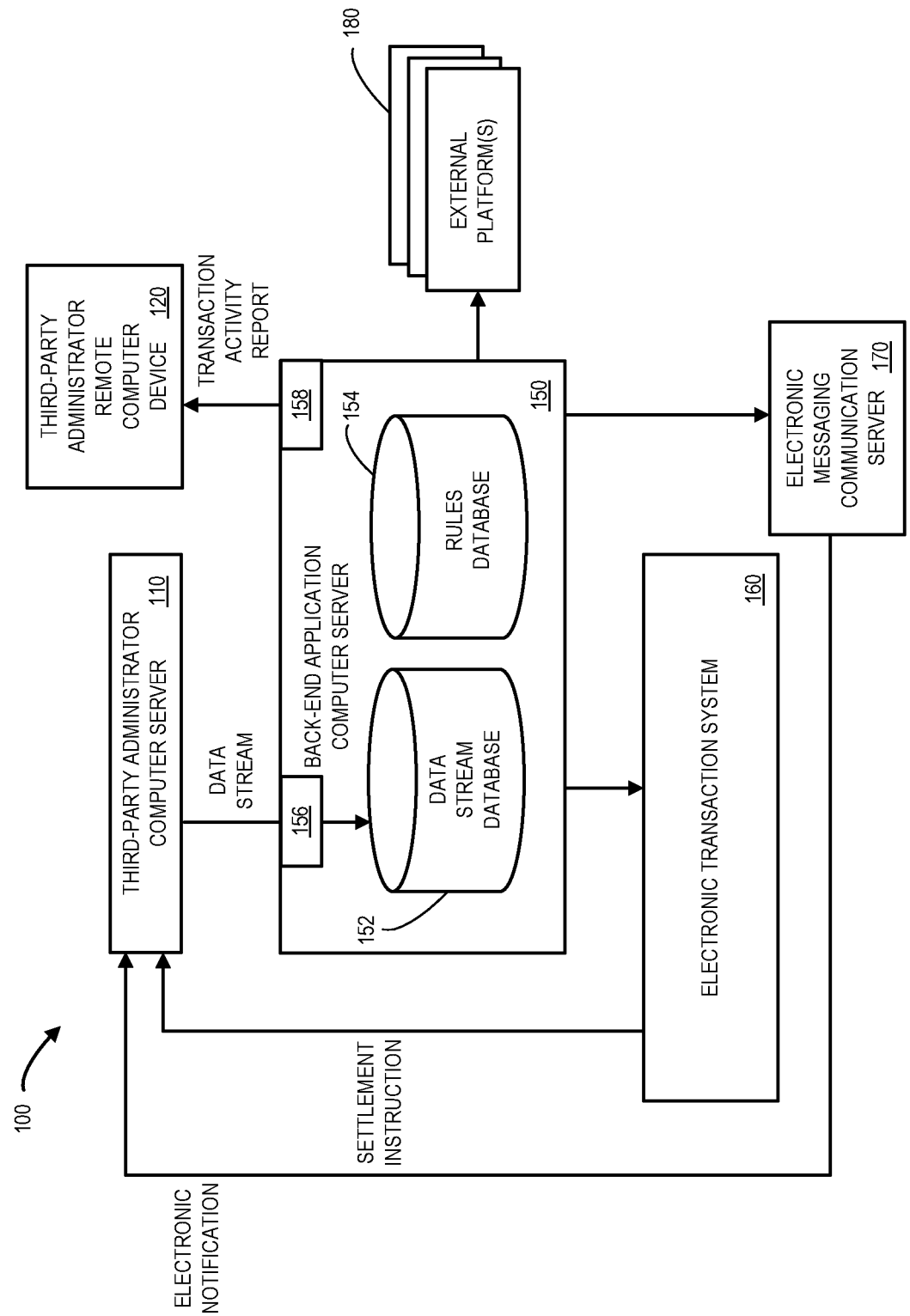
FIG. 1 is block diagram of a system according to some embodiments of the present invention.

Some embodiments described herein may facilitate a dynamic, accurate, and transparent adjustment of request values at a back-end application server. Further, some embodiments may provide a mechanism that automates a user interface that might be used, for example, by operators and/or administrators of a third-party administrator computer server and/or a back-end application computer server. FIG. 1 is block diagram of a system 100 according to some embodiments of the present invention. In particular, the system 100 includes a back-end application computer server 150 that receives information from a third-party administrator computer server 110, stores that information in a data stream computer store or database 152, and also exchanges information with a rules database 154 (e.g., which may store information such that different data streams might be associated with different rules, thresholds, preferences, etc.).

The back-end application computer server 150 might be, for example, associated with a Personal Computers (PC), a spreadsheet application such as the EXCEL® spreadsheet application available from MICROSOFT CORPORATION® (e.g., including spreadsheet workbooks and/or templates), a laptop computer, an enterprise server, a server farm, and/or a database or similar storage devices. The back-end application computer server 150 may, according to some embodiments, further includes rules engine and/or rendering component as described herein.

According to some embodiments, an "automated" back-end application computer server 150 may help promote accurate and transparent adjustments to values received from the third-party administrator computer server 110. For example, the back-end application computer server 150 may automatically output an adjusted value via a Graphical User Interface ("GUI") display along with an explanation of why the value was adjusted. Such a display might be provided, for example, via a third-party administrator remote computer device 120. As used herein, the terms "automated" and "automatically" may refer to, for example, actions that can be performed with little (or no) intervention by a human. Moreover, a present value calculation platform may "dynamically" receive a data stream of electronic messages (including values) and/or generate a portal output in substantially real time.

As used herein, devices, including those associated with the back-end application computer server 150 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 150 may store information into and/or retrieve information from the databases 152, 154. The databases 152, 154 might be associated with, for example, a back-end application. The databases 152, 152 might be locally stored or reside remote from the back-end application computer server 150. According to some embodiments, the back-end application computer server 150 communicates information about an adjusted value, such as by transmitting an electronic file or signal to an electronic transaction system 160, an electronic messaging communication server 170, and/or an external platform 180 (e.g., a workflow management system, calendar application, etc.).

Note that the back-end application computer server 150 might communicate with the third-party administrator computer server 110 via a first communication port 156 and with the third-party administrator remote computer device 120 via a second communication port 158. Further note that these ports 156, 158 might comprise a single device, might provide electronic security measures for a distributed communication network (e.g., a firewall), and/or might provide load balancing services (e.g., arranging for multiple processors and/or programming instances to process information simultaneously) according to some embodiments.

Although a single back-end application computer server 150 is shown in FIG. 1, any number of such devices may be included. Moreover, various devices described herein might be combined according to embodiments of the present invention. For example, in some embodiments, the back-end application computer server 150 and databases 152, 154 might be co-located and/or may comprise a single apparatus.

Figure 2:
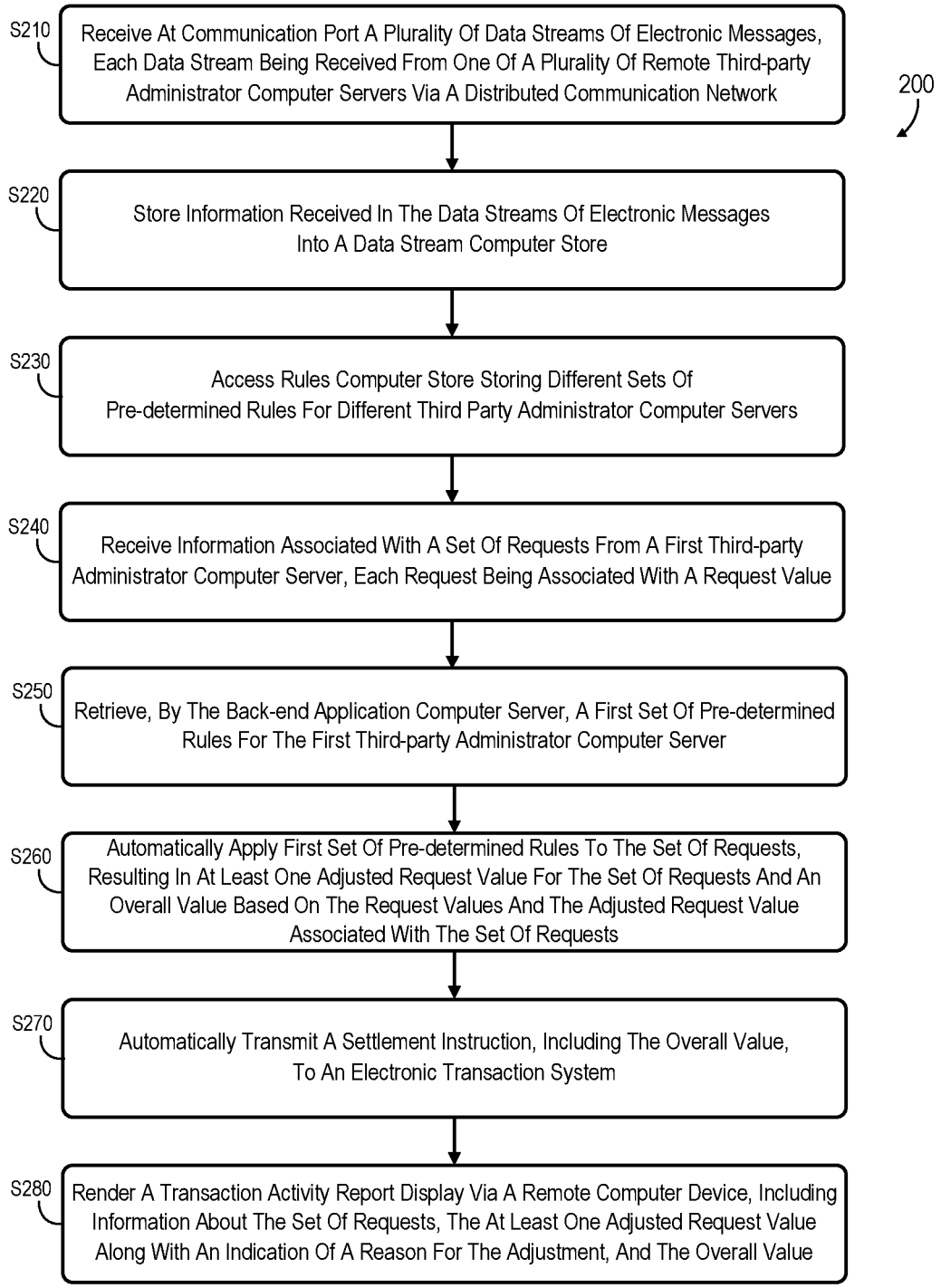
FIG. 2 is a flow diagram of a process according to some embodiments.

FIG. 2 illustrates a method that might be performed, for example, by some or all of the elements of the system 100 described with respect to FIG. 1 according to some embodiments. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a communication port may receive a plurality of data streams of electronic messages, each data stream being received from one of a plurality of remote third-party administrator computer servers via a distributed communication network (e.g., the Internet). According to some embodiments, the communication port is associated with a back-end application computer server. Note that in some embodiments, the back-end application computer server processes multiple data streams from the first third-party administrator computer server, each data stream being associated with a different client (e.g., an employer or trade union) and different set of pre-determined rules for that client. At S220, the system may store information received in the data streams of electronic messages into a data stream computer store.

At S230, the system may access a rules computer store storing different sets of pre-determined rules for different third-party administrator computer servers.

At S240, a back-end application computer server may receive, from the data stream computer store, information associated with a set of requests from a first third-party administrator computer server, each request being associated with a request value.

At S250, the back-end application computer server may retrieve, from the rules computer store, a first set of pre-determined rules for the first third-party administrator computer server. The first set of pre-determined rules might include, for example, an aggregate request value amount (e.g., accumulated values above or below certain thresholds might be automatically adjusted) and/or a rule based on a geographic location associated with a request (e.g., a request associated with a first location might be treated differently as compared to a request associated with another location). As other examples, requests received before (or after) a certain date might be automatically adjusted and/the adjustments made to values could be absolute (e.g., the value is set to zero or some maximum amount), a percentage of the value, etc.

At S260, the back-end application computer server may automatically apply the first set of pre-determined rules to the set of requests from the first third-party administrator computer server. This application of the rules may result in at least one adjusted request value for the set of requests and an overall value based at least in part on the request values and the adjusted request value associated with the set of requests. The automatic application of the first set of pre-determined rules by the back-end application server may be performed, according to some embodiments, on a periodic basis, such as a monthly basis, a bi-weekly basis, or a weekly basis.

At S270, the back-end application computer server may automatically transmit a settlement instruction, including the overall value, to an electronic transaction system. According to some embodiments, the electronic transaction system receives the settlement instruction and, as a result executes a settlement transaction in accordance with the overall value.

At S280, the back-end application computer server may render a transaction activity report display via a remote computer device, associated with the first third-party administrator computer server, including information about the set of requests, the at least one adjusted request value along with an indication of a reason for the adjustment, and the overall value. According to some embodiments, the transaction activity report display is rendered via a spreadsheet application, such as the EXCEL® spreadsheet application available from MICROSOFT CORPORATION®. Note that in some embodiments, the transaction activity report display can be customized, by a user at the remote computer device, to cover a time period from a start date to an end date for the report.

According to some embodiments, application of the first set of pre-determined rules may trigger an automatic transmission of a flag to an electronic messaging communication server. The electronic messaging communication server may receive the flag, and as a result of receiving the flag, trigger an electronic notification from the electronic messaging communication server to the remote computer device associated with the first third-party administrator computer server (e.g., to alert someone that values have been adjusted and/or explain why the values were adjusted).

Figure 3:
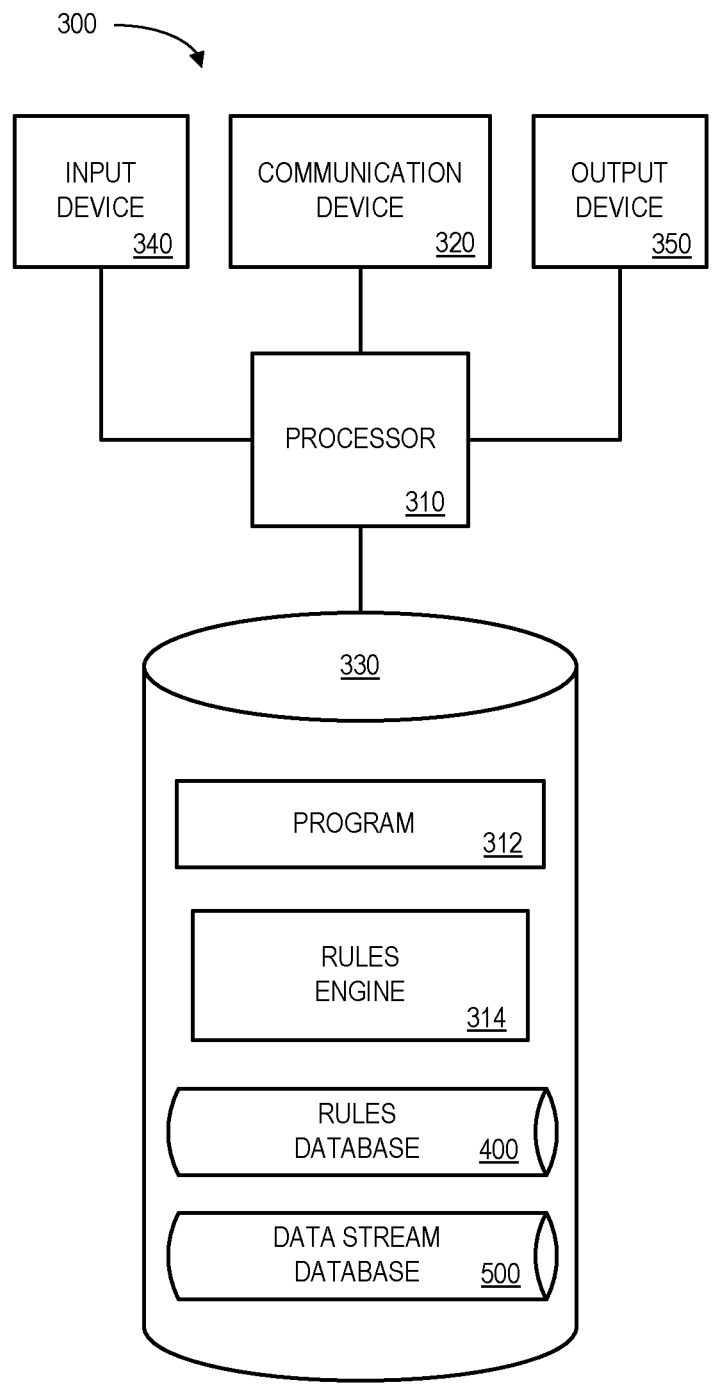
FIG. 3 is block diagram of a back-end application computer server tool or platform according to some embodiments of the present invention.

The embodiments described herein may be implemented using any number of different hardware configurations. For example, FIG. 3 illustrates a back-end application tool or platform 300 that may be, for example, associated with the system 100 of FIG. 1. The back-end application tool or platform 300 comprises a processor 310, such as one or more commercially available Central Processing Units (CPUs) in the form of one-chip microprocessors, coupled to a communication device 320 configured to communicate via a communication network (not shown in FIG. 3). The communication device 320 may be used to communicate, for example, with databases and/or to exchange information with remote third-party administrator computer servers and/or computer devices. The back-end application tool or platform 300 further includes an input device 340 (e.g., a mouse, a keyboard, a touch screen, or a microphone to receive information about rules and/or business logic) and an output device 350 (e.g., to output reports and/or results of operation of the platform 300). Note that the back-end application tool or platform 300 might be associated with a back-end application executing remotely from a third-party administrator computer server.

The processor 310 also communicates with a storage device 330. The storage device 330 may comprise any appropriate information storage device, including combinations of magnetic storage devices (e.g., a hard disk drive), optical storage devices, mobile telephones, and/or semiconductor memory devices. The storage device 330 stores a program 312 and/or a rules engine 314 for controlling the processor 310. The processor 310 performs instructions of the programs 312, 314, and thereby operates in accordance with any of the embodiments described herein. For example, the processor 310 may receive data streams from remote third-party administrator computer servers. In particular, the processor 310 may receive a set of requests from a first third-party administrator computer server, each request being associated with a request value. The processor 310 may retrieve a first set of pre-determined rules and automatically apply them to the set of requests, resulting in an adjusted request value and an overall value. The processor 310 may then automatically transmit a settlement instruction, including the overall value, to an electronic transaction system, and render a transaction activity report display via a remote computer device, associated with the first third-party administrator computer server, including information about the set of requests, the adjusted request value along with an indication of a reason for the adjustment, and the overall value.

The programs 312, 314 may be stored in a compressed, uncompiled and/or encrypted format. The programs 312, 314 may furthermore include other program elements, such as an operating system, a database management system, and/or device drivers used by the processor 310 to interface with peripheral devices.

As used herein, information may be "received" by or "transmitted" to, for example: (i) the back-end application tool or platform 300 from another device; or (ii) a software application or module within the back-end application tool or platform 300 from another software application, module, or any other source.

In some embodiments (such as shown in FIG. 3), the storage device 330 further stores a rules database 400 (e.g., containing different rules for various third-party administrator platforms) and a data stream database 500 (e.g., to store inputs as they are received). Examples of databases that may be used in connection with the back-end application tool or platform 300 will now be described in detail with respect to FIGS. 4 and 5. Note that the databases described herein are only examples, and additional and/or different information may be stored therein. Moreover, various databases might be split or combined in accordance with any of the embodiments described herein. For example, the rules database 400 and/or data stream database 500 might be combined and/or linked to each other within the rules engine 314.

Figure 4:
FIG. 4 is a tabular portion of a rules database according to some embodiments.

Referring to FIG. 4, a table is shown that represents a rules database 400 that may be stored at the back-end application tool or platform 300 according to some embodiments. The table may include, for example, entries that may be associated with different data streams. The table may also define fields 402, 403, 404, 406 for each of the entries. The fields 402, 403, 404, 406 may, according to some embodiments, specify: an identifier 402, a sub-identifier 403, a first rule 404, and a second rule 406. The rules database 400 may be created and updated, for example, as information is received when new third-party administrator platforms are added to, or removed from, the system.

The third-party administrator identifier 402 and sub-identifier 403 may be, for example, a unique alphanumeric code identifying a particular third-party administrator platform and/or a specific client or data stream associated with that third-party administrator platform. The rules 404, 406 may define how request values received in a particular data stream are to be reviewed and or adjusted. Although two rules 404, 406 are defined in the rules database 400, note that any number of rules and/or types of business logic may be supported.

By way of example, the first rule 404 for identifier (sub-identifier) "101(1)" indicates that request values should not be passed through (e.g., to another system such as an electronic transaction system) until a total of 1,000 has been accumulated. Moreover, the second rule 406 indicates that accumulated values over 10,000 should never be passed through. Note that the values described in the rules 404, 406 might be associated with any physical characteristic, electronic measurement or representation, etc.

Figure 5:
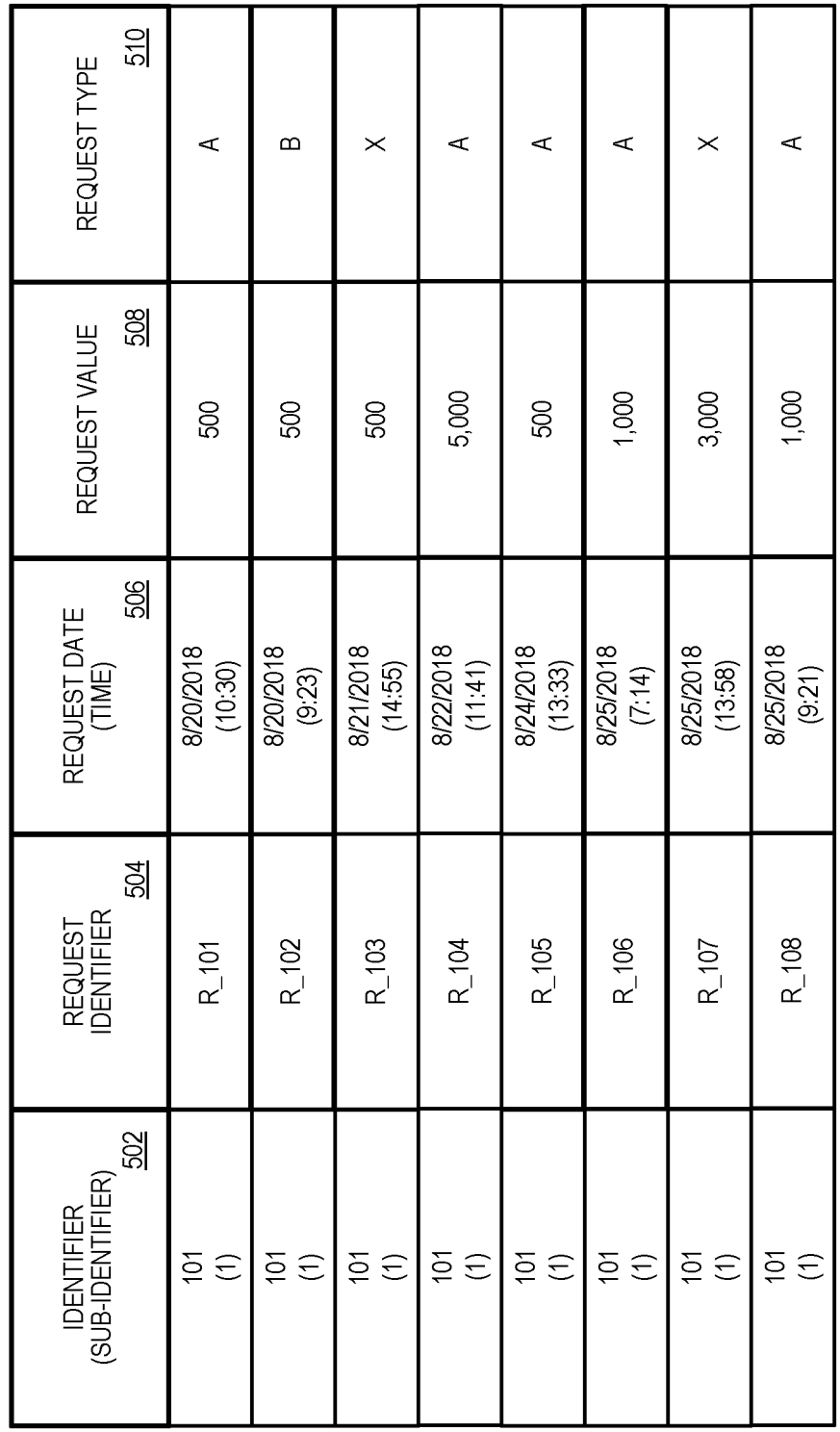
FIG. 5 is a tabular portion of a data stream database according to some embodiments.

Referring to FIG. 5, a table is shown that represents a data stream database 500 that may be stored at the back-end application tool or platform 300 according to some embodiments. The table may include, for example, entries associated with requests received in different data streams by the back-end application tool or platform 300. The table may also define fields 502, 504, 506, 508, 510 for each of the entries. The fields 502, 504, 506, 508, 510 may, according to some embodiments, specify: an identifier (sub-identifier) 502, a request identifier 504, a request date and time 506, a request value 508, and a request type 510. The data stream database 500 may be created and updated, for example, as information is received from various third-party administrator computer servers.

The identifier (sub-identifier) 502 may be, for example, a unique alphanumeric code identifying a particular third-party administrator identifier platform/data stream and may be based on or associated with the identifier 402 and sub-identifier 403 in the rules database 400. The request identifier 504 may be, for example, a unique alphanumeric code identifying a particular request received from a third-party administrator identifier platform and the date and time 506 may indicate when that request was received. The request value 508 may an amount included within the request and may be associated with any physical characteristic, electronic measurement or representation, etc. The request type 510 may place the request into one or more categories that could be associated with, for example, a location, an entity, a type of value, etc.

FIG. 6 is an example of a transaction activity report user interface display 600 associated with a first example in accordance with some embodiments. In particular, the display 600 illustrates how the eight requested illustrated in FIG. 5 (R_101 through R_108) are processed by the back-end application server based on the first rule 404 and the second rule 406 for the identifier 402 "101" and sub-identifier 403 "1" as illustrated in FIG. 4. Starting with the first two requests (R_101 and R_102), the request values of 500 are reduced to zero because the accumulated values have not accumulated to 1,000 (as required by the first rule 404), and that reason is indicated on the display 600. The values associated with R_103 through R_106 are not adjusted at all (and no reason needs to be given on the display 600). The next request R_107 is adjusted from 5,000 to 3,000 because 2,000 of the value is above an accumulated amount of 10,000 (as required by the second rule 406), and that reason is given on the display 600. The last request R_108 request value is reduced to zero because the entire value is above the 10,000 threshold (and that reason is provided on the display 600). In this way, a user of the display 600 can receive a "transparent" view of the information (e.g., he or she can easily understand why various request values were adjusted).

Embodiments described herein, may be associated with a number of different back-end environments. In some cases, an insurer and an insured are associated with a party who is potentially entitled to receive a benefit. For example, an insured may purchase a workers' compensation insurance policy from an insurer, and both the insured and insurer may have obligations with respect to benefits that must be provided to a worker (who was injured while he or she was working). Depending on the terms and conditions of the particular insurance policy, the insured may be responsible for some payments while the insurer is responsible for other payments. For example, an employer might be responsible for payments to employees up to a deductible amount and the insurer might be responsible for payments over the deductible amount. Note that a third-party administrator may interact with and provide payments to employees and then arrange for the employer or insurer to reimburse those payments as appropriate. In other cases, escrow accounts may be established, an overall payment cap above which an insurer will not provide certain types of payments may be provided, etc.

Figure 7:
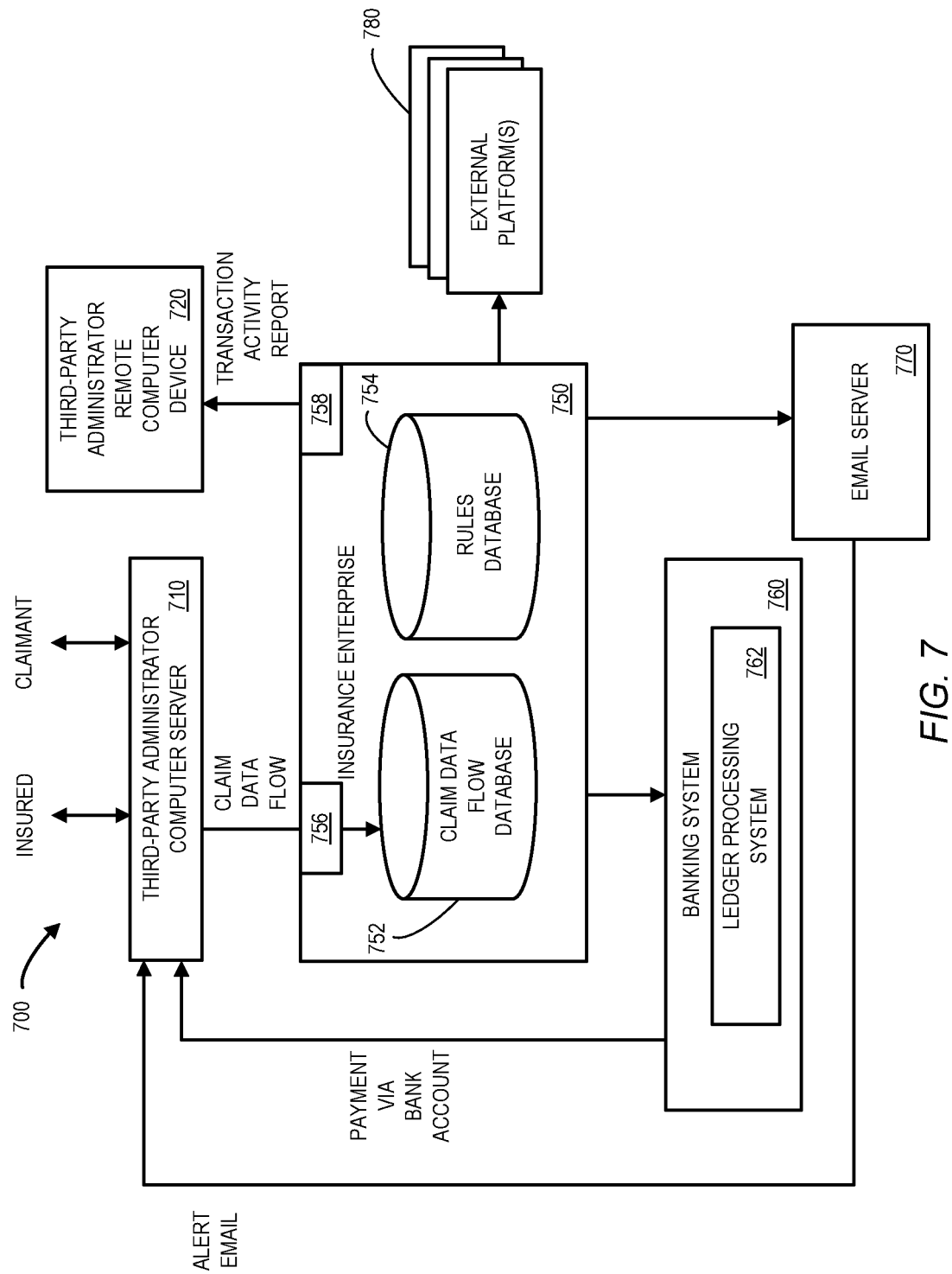
FIG. 7 is block diagram of a system associated with an insurance enterprise according to some embodiments of the present invention.

FIG. 7 is block diagram of a system 700 associated with an insurance enterprise according to some embodiments of the present invention. As before, the system 700 includes an insurance enterprise computer server 750 that receives information from a third-party administrator computer server 710, stores that information in a claim data flow database or database 752, and also exchanges information with an insurance policy database 754 (e.g., which may store information such that different third-party administrator computer servers might be associated with different deductibles, exceptions, preferences, etc.).

The insurance enterprise computer server 750 might be, for example, associated with a PC, a spreadsheet application such as the EXCEL® spreadsheet application available from MICROSOFT CORPORATION® (e.g., including spreadsheet workbooks and/or templates), a laptop computer, an enterprise server, a server farm, and/or a database or similar storage devices. The insurance enterprise computer server 750 may, according to some embodiments, further includes rules engine and/or rendering component as described herein.

According to some embodiments, an "automated" insurance enterprise computer server 750 may help promote accurate and transparent adjustments to insurance claim values received from the third-party administrator computer server 710. For example, the insurance enterprise computer server 750 may automatically output an adjusted insurance claim value via a GUI display along with an explanation of why the value was adjusted. Such a display might be provided, for example, via a third-party administrator remote computer device 720 (e.g., associated with a web portal, smartphone, etc.).

As used herein, devices, including those associated with the insurance enterprise computer server 750 and any other device described herein, may exchange information via any communication network which may be one or more of a LAN, a MAN, a WAN, a proprietary network, a PSTN, a WAP network, a Bluetooth network, a wireless LAN network, and/or an IP network such as the Internet, an intranet, or an extranet. Note that any devices described herein may communicate via one or more such communication networks.

The insurance enterprise computer server 750 may store information into and/or retrieve information from the databases 752, 754. The databases 752, 754 might be associated with, for example, a back-end application. The databases 752, 752 might be locally stored or reside remote from the insurance enterprise computer server 750. According to some embodiments, the insurance enterprise computer server 750 communicates information about an adjusted insurance claim value, such as by transmitting an electronic file or signal to a banking system 760 (which may include a ledger processing system 762) to facilitate an Automated Clearinghouse ("ACH") payment via a bank associated with the third-party administrator, an email communication server 770 (e.g., to send automatically created alert emails to the third-party administrator when an insurance claim value is adjusted, and/or an external platform 780 (e.g., a workflow management system, calendar application, etc.).

Note that the insurance enterprise computer server 750 might communicate with the third-party administrator computer server 710 via a first communication port 756 and with the third-party administrator remote computer device 720 via a second communication port 758. Further note that these ports 756, 758 might comprise a single device, might provide electronic security measures for a distributed communication network (e.g., a firewall), and/or might provide load balancing services (e.g., arranging for multiple processors and/or programming instances to process information simultaneously) according to some embodiments.

Although a single insurance enterprise computer server 750 is shown in FIG. 7, any number of such devices may be included. Moreover, various devices described herein might be combined according to embodiments of the present invention. For example, in some embodiments, the insurance enterprise computer server 750 and databases 752, 754 might be co-located and/or may comprise a single apparatus.

Figure 8:
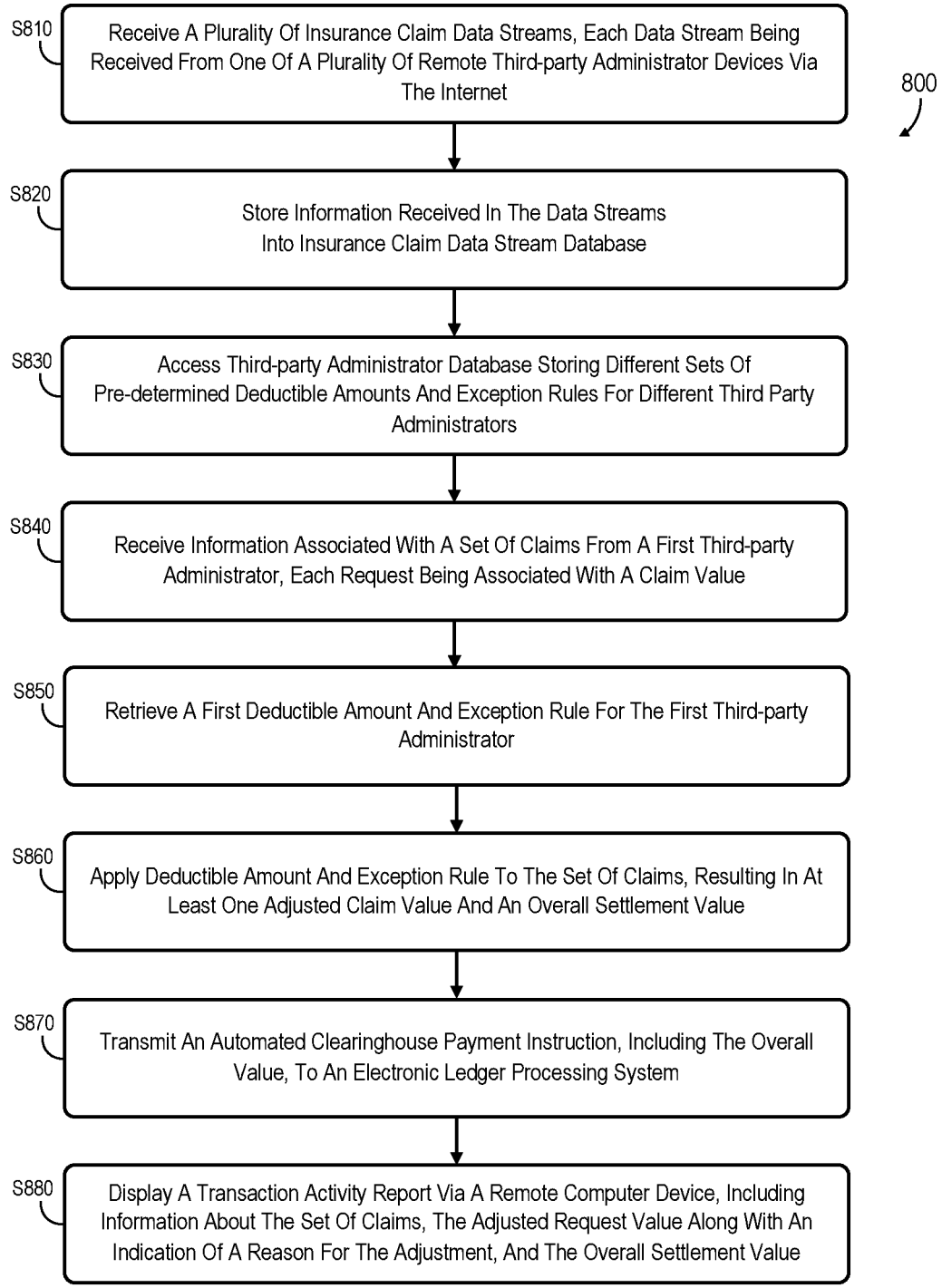
FIG. 8 is a flow diagram of a process associated with an insurance enterprise in accordance with some embodiments.

FIG. 8 illustrates a method that might be performed, for example, by some or all of the elements of the system 700 described with respect to FIG. 7 according to some embodiments. At S810, a plurality of data streams may be received, each data stream being received from one of a plurality of remote third-party administrator computer servers via the Internet. According to some embodiments, the communication port is associated with an insurance enterprise computer server. Note that in some embodiments, the insurance enterprise computer server processes multiple data streams from a first third-party administrator, each data stream being associated with a different client (e.g., an employer or trade union) and a particular deductible amount and exception rule for that client. Further note that in some embodiments a single client could have two or more associated data streams each associated with different types of insurance coverages. For example, to single client may have both workers' compensation insurance and group benefits insurance, each having different rules, deductibles, exceptions, etc. At S820, the system may store information received in the data streams into an insurance claim data stream database. At S830, the system may access an insurance database storing different deductible amounts and exception rules for different third-party administrator computer servers.

At S840, an insurance enterprise computer server may receive, from the insurance claim data stream database, information associated with a set of insurance claims from a first third-party administrator, each insurance claim being associated with an insurance claim value.

At S850, the insurance enterprise may retrieve, from the insurance policy, a first deductible amount and exception rule for the first third-party administrator. The first deductible amount and exception rule might include, for example, an aggregate insurance claim value amount (e.g., accumulated values (accumulated over an insurance policy period or a current month) above or below certain dollar thresholds might be automatically adjusted) and/or a rule based on a geographic location associated with a request (e.g., a request associated with a first state might be treated differently as compared to a request associated with another state). As other examples, requests received before (or after) a certain policy dates might be automatically adjusted and/the adjustments made to values could be absolute (e.g., the value is set to zero or some maximum amount), a percentage of the value may be prorated between an insurer and an employer, etc.

At S860, the insurance enterprise may automatically apply the first deductible amount and exception rule to the set of insurance claims from the first third-party administrator. This application may result in at least one adjusted insurance claim value for the set of claims and an overall settlement value based at least in part on the insurance claim values and the adjusted insurance claim value. The automatic application may be performed, according to some embodiments, on a periodic basis, such as a monthly basis, a bi-weekly basis, or a weekly basis.

At S870, the insurance enterprise may automatically transmit an ACH settlement instruction, including the overall value, to a banking system. According to some embodiments, the banking system receives the settlement instruction and, as a result executes a settlement payment transaction to a bank in accordance with the overall settlement value.

At S880, the insurance enterprise computer server may display a transaction activity report display via a remote computer device, associated with the first third-party administrator, including information about the set of insurance claims, the at least one adjusted insurance claim value along with an indication of a reason for the adjustment, and the overall settlement value. According to some embodiments, the transaction activity report display is rendered via a spreadsheet application, such as the EXCEL® spreadsheet application available from MICROSOFT CORPORATION® and/or a web portal interface. Note that in some embodiments, the transaction activity report display can be customized, by a user at the remote computer device, to cover a time period from a start date to an end date for the report. According to some embodiments, a transaction activity spreadsheet report may further include a display of: a current month payable amount, a current policy period payment amount, a date associated with a claim, and a geographic location exception indication.

According to some embodiments, application of the first deductible amount or exception rules may trigger an automatically transmission of a flag to an email server. The email server may receive the flag, and as a result of receiving the flag, trigger an email notification from the email server to the remote computer device associated with the first third-party administrator computer server (e.g., to alert someone that insurance claim values have been adjusted and/or explain why the values were adjusted).

According to some embodiments, the method 800 of FIG. 8 may be associated with a medical insurance policy and/or a workers' compensation insurance policy. Moreover, the deductible amount might be associated with at least one of: (i) a standard deductible amount, (ii) a loss limit, (iii) a retention amount, (iv) a cap amount, (v) a step amount, (vi) an escrow account, (vii) an insurance basket, (viii) a corridor deductible, (ix) a crash deductible, and/or (x) a date associated with an insurance claim. The exception rule may be associated with, for example, at least one of: (i) a type of insurance claim, (ii) a geographic location associated with an insurance claim, and/or (iii) a specific provision of an insurance policy.

According to some embodiments, an insurance enterprise server is configured to generate at least one of: (i) a reconciliation message, and (ii) an excess calculation report. For example, an excess calculation report includes at least one of: (i) an exception identifier, (ii) an exception state, and (iii) an exception amount. For example, the insurance enterprise might need to pay 100% of medical expenses if the insurance claim originated from California (but not if the claim originated in Texas). A transaction activity spreadsheet report might include, according to some embodiments, at least five of: (i) a claim level payable amount, (ii) a transactions total amount, (iii) a cumulative total paid, (iv) a claimant, (v) a claim number, (vi) an insurer claim number, (vii) a date of loss, (viii) a transaction amount, (ix) a payment description, (x) a draft or check number, (xi) a draft date, (xii) an account name, (xiii) a product name, (xix) an insurance policy number, (xx) a deductible/loss limit/retention amount, (xxi) a policy inception date, (xxii) a policy expiration date, (xxiii) a third-party administrator identifier, (xxiv) a third-party administrator name, (xxv) an organization identifier, (xxvi) a valuation date, (xxvii) a payable document number, (xxviii) a line of business, (xxix) an entry code, (xxx) a loss event branch, (xxxi) a loss event identifier, and (xxxii) a loss event claim counter.

FIG. 9 is an example of a transaction activity report user interface display 900 associated with insurance in accordance with some embodiments. The display 900 might provide information about insurance claims submitted (or resolved) during a particular time period. By way of example, the display might include a claim level payable amount (e.g., an amount reimbursed for specific claim; a transactions total amount (e.g., a total activity on a claim for a specified period, and note that this period could be different than the claim level payable amount); a cumulative total paid (e.g., a total amount of funds paid at the claim level; a claimant (e.g., a claimant name); a third-party administrator claim number (e.g., a third-party administrator claim number; an insurance enterprise claim number (e.g., a claim number assigned by the insurance enterprise); a date of loss; a transaction amount (e.g., a transaction level detail); payment description; third-party administrator draft or check number; a third-party administrator draft date (e.g., a transaction date); an account name; a pricing plan (e.g., a type of coverage, such as guaranteed cost, deductible, prefunded deductible, conventional retro, and/or paid loss retro); a product name line of business (e.g., a workers' compensation, general liability); a policy number (e.g., an insurance enterprise policy number); deductible/loss limit/retention values; a policy inception date; a policy expiration date; a third-party administrator name; a valuation date (e.g., which might include all data received and processed by the insurance enterprise from the first of the month to the valuation date, such as the last day of the month); and/or a Line Of Business ("LOB").

FIG. 10 is an example of an excess calculation report user interface display 1000 associated with insurance in accordance with some embodiments. The display 1000 might include, for example: a third-party administrator name; a third-party administrator account number or name; a program effective date; a program expiration date; an insurance policy number; a policy effective date; a policy expiration date; a product; included products; a pricing plan; retention limits; claim/occurrence limits; application; prop ale (y/n); a basket/policy aggregate amount; a step limits-definition a step claim a step amount; a corridor-definition; a corridor; a corridor amount; a clash; a clash claim; a clash amount; an exception definition; an exceptions (type); exceptions (state, etc.); and a limit amount. The display 1000 might further include, for example: a state; a third-party administrator claim number; key claim number; claim; a loss limit; an adjustment type (abs or adj); a loss limit adjustment amount; a limit; a prior ind paid; prior med paid; prior exp paid; total prior; current ind paid; current med paid; current exp paid; a total current; and a claim level payable.

Figure 11:
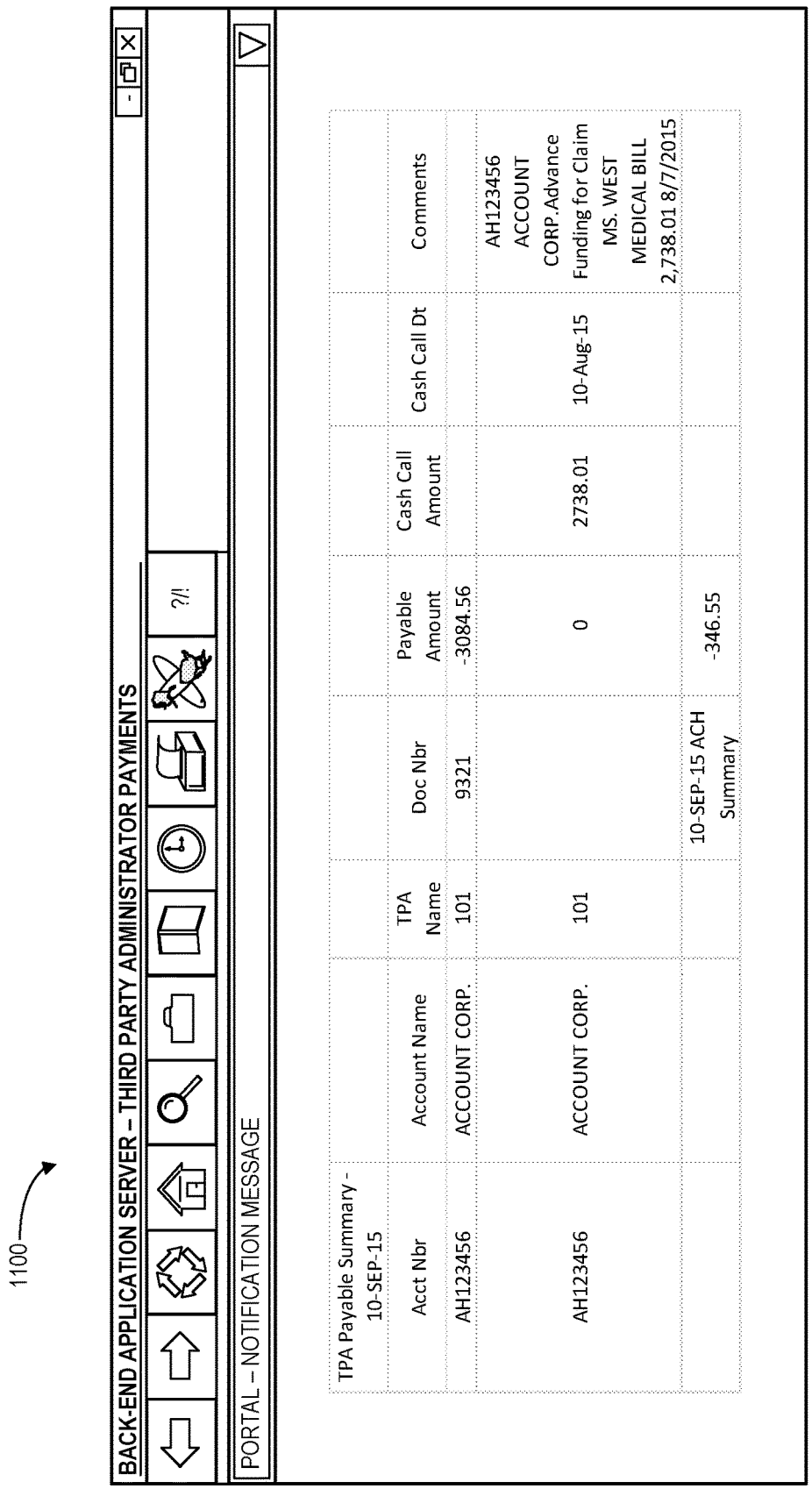
FIG. 11 is an example of notification message display according to some embodiments.

FIG. 11 is an example of notification message display 1100 according to some embodiments. The notification message display 1100 might include, for example, an account number, an account name, a third-party administrator name, a document number, a payable amount, a cash call amount, a cash call date, and/or comments (e.g., associated with adjustments made to insurance claim amounts).

Thus, embodiments may provide systems and methods to facilitate a dynamic, accurate, and transparent adjustment of request values for a back-end application. According to some embodiments, funding invoices will no longer be necessary for accounts subject to payables process. Moreover, in some embodiments, the automated funding schedule is flexible (weekly, bi-weekly or monthly) and can be based on a third-party administrator preference. Further, in some cases, funds may be deposited into each third-party administrator's designated bank account(s) approximately seven (7) days after a production data feed. In some embodiments, check register style payable documents reflecting funding transactions for a third-party administrator may be available.

Figure 12:
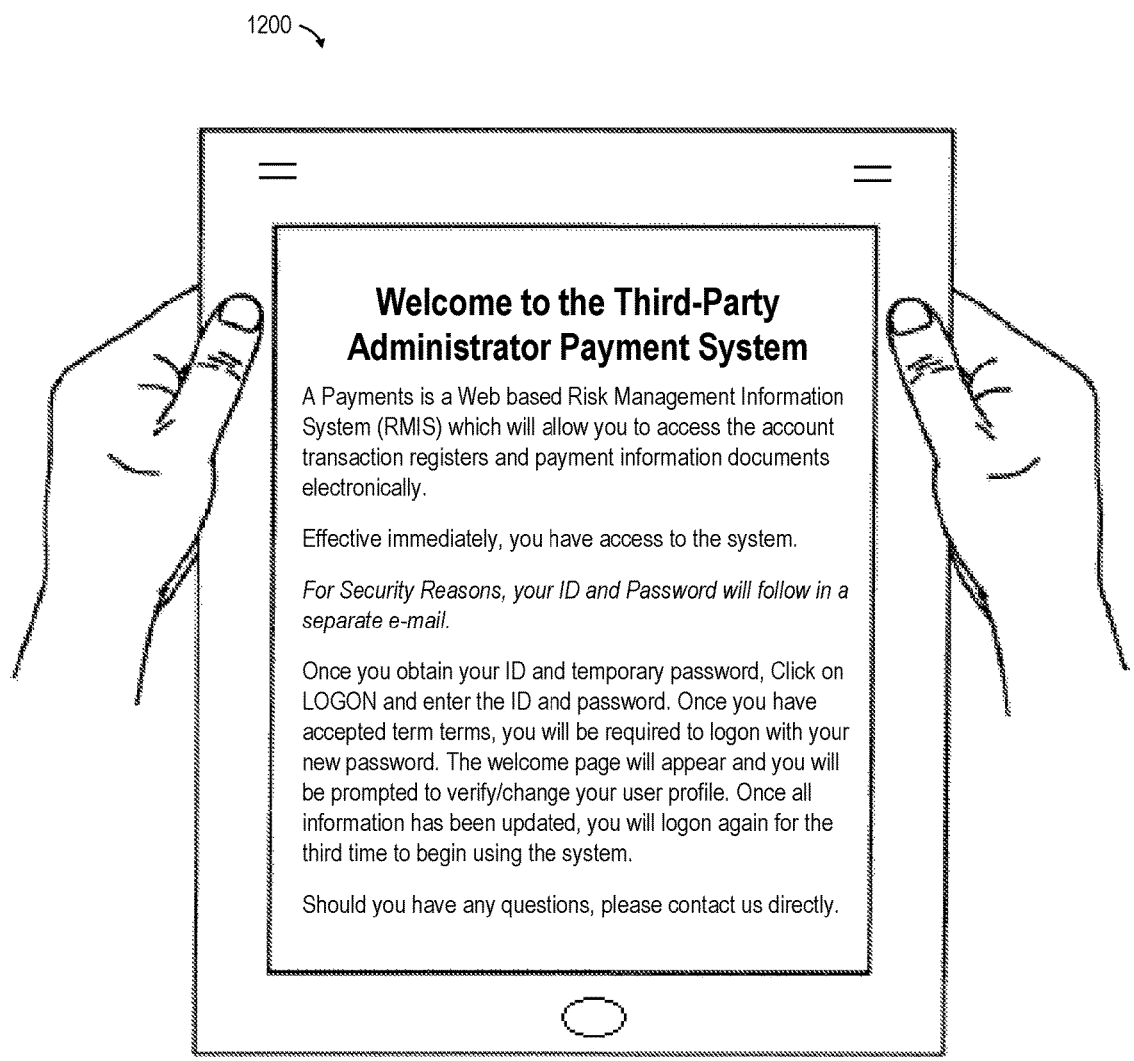
FIG. 12 illustrates a handheld tablet welcome message display according to some embodiments described herein.

Although specific hardware and data configurations have been described herein, note that any number of other configurations may be provided in accordance with embodiments of the present invention (e.g., some of the information associated with the databases described herein may be combined or stored in external systems). Additionally, one or more of the elements described herein may be practiced in a distributed cloud computing environment where tasks are performed by logically or physically remote processing devices that are linked through one or more communications networks. For example, FIG. 12 illustrates a handheld tablet 1200 welcome display according to some embodiments described herein. In particular, the handheld tablet 1200 is displaying welcome message that might be transmitted to a new user or third-party administrator of any of the systems described herein.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A system to improve an accuracy of information generated by a back-end application computer server, comprising:
   (a) a communication port to facilitate receipt of a plurality of data streams of electronic messages, each data stream being received from one of a plurality of remote third-party administrator computer servers via a distributed communication network;
   (b) a data stream computer store to store information received in the data streams of electronic messages;
   (c) a rules computer store to store different sets of pre-determined rules for different third-party administrator computer servers;
   (d) the back-end application computer server, coupled to the communication port, the data stream computer store, and the rules computer store, programmed to:
      (i) receive from the data stream computer store information associated with a set of requests from a first third-party administrator computer server, each request being associated with a request value,
      (ii) retrieve from the rules computer store a first set of pre-determined rules for the first third-party administrator computer server,
      (iii) automatically apply the first set of pre-determined rules to the set of requests from the first third-party administrator computer server, said application resulting in at least one adjusted request value for the set of requests and an overall value based at least in part on the request values and the adjusted request value associated with the set of requests,
      (iv) automatically transmit a settlement instruction, including the overall value, to an electronic transaction system, and
      (v) as a result of application of the first set of pre-determined rules, automatically transmit a flag to an electronic messaging communication server;
   (e) the electronic transaction system to receive the settlement instruction and to execute a settlement transaction in accordance with the overall value; and
   (f) the electronic messaging communication server to receive said flag, and as a result of receiving said flag, trigger an electronic notification from the electronic messaging communication server to the remote computer device associated with the first third-party administrator computer server.

2. The system of claim 1, wherein the communication port further provides at least one of: (i) security features for the distributed communication network, and (ii) load balancing functionality.

3. The system of claim 1, wherein the back-end application computer server is to process multiple data streams from the first third-party administrator computer server, each data stream being associated with a different client and different set of pre-determined rules for that client.

4. The system of claim 1, wherein said automatic application of the first set of pre-determined rules by the back-end application server is performed on a periodic basis associated with at one of: (i) a monthly basis, (ii) a bi-weekly basis, or (iii) a weekly basis.

5. The system of claim 1, wherein the first set of pre-determined rules includes at least one of: (i) an aggregate request value amount, and (ii) a rule based on a geographic location associated with a request.

6. The system of claim 1, wherein a transaction activity report display is rendered via a spreadsheet application.

7. The system of claim 1, wherein a transaction activity report display can be customized, by a user at the remote computer device, to cover a time period from a start date to an end date for the report.

8. A computerized method to improve an accuracy of information generated by a back-end application computer server, comprising:
   receiving at a communication port a plurality of data streams of electronic messages, each data stream being received from one of a plurality of remote third-party administrator computer servers via a distributed communication network;
   storing information received in the data streams of electronic messages into a data stream computer store;
   accessing a rules computer store storing different sets of pre-determined rules for different third-party administrator computer servers;
   receiving, by a back-end application computer server from the data stream computer store, information associated with a set of requests from a first third-party administrator computer server, each request being associated with a request value;
   retrieving, by the back-end application computer server from the rules computer store, a first set of pre-determined rules for the first third-party administrator computer server;
   automatically applying, by the back-end application computer server, the first set of pre-determined rules to the set of requests from the first third-party administrator computer server, said application resulting in at least one adjusted request value for the set of requests and an overall value based at least in part on the request values and the adjusted request value associated with the set of requests;
   as a result of applying the first set of pre-determined rules, automatically transmitting, by the back-end application computer server, a flag to an electronic messaging communication server;

automatically transmitting, by the back-end application computer server, a settlement instruction, including the overall value, to an electronic transaction system;

receiving, by the electronic transaction system, the settlement instruction and executing a settlement transaction in accordance with the overall value; and receiving, by the electronic messaging communication server, said flag and as a result of receiving said flag, triggering an electronic notification from the electronic messaging communication server to the remote computer device associated with the first third-party administrator computer server.

9. The method of claim 8, further comprising:
providing security features for the distributed communication network; and
providing load balancing functionality.

10. The method of claim 9, wherein the back-end application computer server is to process multiple data streams from the first third-party administrator computer server, each data stream being associated with a different client and different set of pre-determined rules for that client.

11. The method of claim 8, wherein said automatic application of the first set of pre-determined rules by the back-end application server is performed on a periodic basis associated with at one of: (i) a monthly basis, (ii) a bi-weekly basis, or (iii) a weekly basis.

12. The method of claim 8, wherein the first set of pre-determined rules includes at least one of: (i) an aggregate request value amount, and (ii) a rule based on a geographic location associated with a request.

13. A system to improve an accuracy of information generated by an insurance enterprise computer server, comprising:
(a) a communication port to receive a plurality of insurance claim data streams, each insurance claim data stream being received from one of a plurality of remote third-party administrator devices via the Internet;
(b) an insurance claim data stream database to store information received in the insurance claim data streams;
(c) an insurance policy database to store different sets of pre-determined deductible amounts and exception rules for different third-party administrators;
(d) the insurance enterprise server, coupled to the communication port, the insurance claim data stream database, and the insurance policy database, programmed to:
(i) receive from the insurance claim data stream database information associated with a set of claims from a first third-party administrator, each claim being associated with a claim value,
(ii) retrieve from the insurance policy database a first pre-determined deductible amount and exception rule for the first third-party administrator,
(iii) automatically apply the first pre-determined deductible amount and exception rule to the set of claims from the first third-party administrator, said application resulting in at least one adjusted claim value for the set of claims and an overall settlement value based at least in part on the claim values and the adjusted claim value associated with the set of claims,
(iv) automatically transmit an automated clearinghouse payment instruction, including the overall settlement value, to an electronic banking system, and
(v) as a result of application of the first pre-determined deductible amount and exception rule, automatically transmit a flag to an electronic messing communication server;
(e) the electronic banking system to receive the automated clearinghouse payment instruction and to execute a settlement in accordance with the overall settlement value; and
(f) the electronic messaging communication server to receive said flag, and as a result of receiving said flag, trigger an electronic notification from the electronic messaging communication server to the remote computer device associated with the first third-party administrator device.

14. The system of claim 13, wherein the insurance policy is associated with at least one of: (i) a medical insurance policy, and (ii) a workers' compensation insurance policy.

15. The system of claim 13, wherein the deductible amount is associated with at least one of: (i) a standard deductible amount, (ii) a loss limit, (iii) a retention amount, (iv) a cap amount, (v) a step amount, (vi) an escrow account, (vii) an insurance basket, (viii) a corridor deductible, (ix) a crash deductible, and (x) a date associated with an insurance claim.

16. The system of claim 13, wherein the exception rule is associated with at least one of: (i) a type of insurance claim, (ii) a geographic location associated with an insurance claim, and (iii) a specific provision of an insurance policy.

17. The system of claim 13, wherein the insurance enterprise server is further to generate at least one of: (i) a reconciliation message, and (ii) an excess calculation report.

18. The system of claim 17, wherein the excess calculation report includes at least one of: (i) an exception identifier, (ii) an exception state, and (iii) an exception amount.

19. The system of claim 13, wherein a transaction activity spreadsheet report includes at least five of: (i) a claim level payable amount, (ii) a transactions total amount, (iii) a cumulative total paid, (iv) a claimant, (v) a claim number, (vi) an insurer claim number, (vii) a date of loss, (viii) a transaction amount, (ix) a payment description, (x) a draft or check number, (xi) a draft date, (xii) an account name, (xiii) a product name, (xix) an insurance policy number, (xx) a deductible/loss limit/retention amount, (xxi) a policy inception date, (xxii) a policy expiration date, (xxiii) a third-party administrator identifier, (xxiv) a third-party administrator name, (xxv) an organization identifier, (xxvi) a valuation date, (xxvii) a payable document number, (xxviii) a line of business, (xxix) an entry code, (xxx) a loss event branch, (xxxi) a loss event identifier, and (xxxii) a loss event claim counter.

20. The system of claim 13, wherein:
a transaction activity spreadsheet report further includes a display of: (i) a current month payable amount, (ii) a current policy period payment amount, and (iii) a date associated with a claim; and
an excess calculation report includes a display of a geographic location exception indication.

* * * * *